(12) United States Patent
Nomiya et al.

(10) Patent No.: US 6,738,269 B2
(45) Date of Patent: May 18, 2004

(54) LINE LINKAGE PROTECTIVE DEVICE FOR ELECTRICITY GENERATION EQUIPMENT (75) Inventors: Shigeo Nomiya, Funabashi (JP);
Takeshi Taniguchi, Hyogo-ken (JP);
Shinichiro Tochio, Hyogo-ken (JP)

(73) Assignees: Kabushiki Kaisha Toshiba, Tokyo (JP); Nishishiba Electric Co., Ltd., Himeji (JP)

( * ) Notice: Subject to any disclaimer, the term of this patent is extended or adjusted under 35 U.S.C. 154(b) by 50 days.

(21) Appl. No.: 09/955,219

(22) Filed: Sep. 19, 2001

(65) Prior Publication Data

US 2002/0048179 A1 Apr. 25, 2002

(30) Foreign Application Priority Data

| Sep. 19, 2000 | (JP) | 2000-283910 |
| Sep. 19, 2000 | (JP) | 2000-284173 |
| Mar. 16, 2001 | (JP) | 2001-076843 |

(51) Int. Cl.⁷ .............. H02H 7/10; H02H 3/04
(52) U.S. Cl. .......... 363/50; 361/170; 361/93.2; 307/87; 324/76.41
(58) Field of Search .............. 363/50, 52, 55; 323/207, 208, 209, 210; 361/160, 166, 168.1, 170, 94, 93.2; 324/76.39, 76.41; 307/86, 87; 700/292

(56) References Cited

U.S. PATENT DOCUMENTS 4,335,413 A * 6/1982 Engel et al. .......... 361/93.2
6,107,784 A * 8/2000 Nomiya et al. .......... 323/205
6,456,056 B1 * 9/2002 Katoh et al. .......... 324/76.41

FOREIGN PATENT DOCUMENTS

| EP | 0 810 713 A | 12/1997 |
| GB | 2 159 010 A | 11/1985 |
| JP | 2000-217260 | 8/2000 |

OTHER PUBLICATIONS

Katoh et al.; "Interconnection Protective Device for Generator Set"; U.S. patent application No. 09/812,560, filed Mar. 21, 2000.

* cited by examiner

Primary Examiner—Jessica Han
(74) Attorney, Agent, or Firm—Finnegan, Henderson, Farabow, Garrett & Dunner, L.L.P.

(57) ABSTRACT

A device includes a governor for controlling the frequency of the generator of a private power generation equipment, function generating means having a function characteristic for detecting the frequency variation rate of the generator and outputting a large output to the value thereof, effective power adjusting means for outputting an output proportionate to the signal, and protective relays for sensing abnormality of the frequency variation rate of the generator, so that, by making the signal in which an output from the function generating means and an output from the effective power adjusting means are synthesized an instruction signal of the governor, and shifting the frequency variation rate of the generator to a level sensed by the protective relays by the function characteristic of the function generating means at the power outage on the alternating current power line side, to detect the power outage on the alternating current power line side.

4 Claims, 9 Drawing Sheets

FIG. 12B

LINE LINKAGE PROTECTIVE DEVICE FOR ELECTRICITY GENERATION EQUIPMENT

CROSS-REFERENCE TO RELATED APPLICATIONS

This application is based upon and claims the benefit of priority from the prior Japanese Patent Applications No. 2000-283910, filed Sep. 19, 2000; No. 2000-284173, filed Sep. 19, 2000; and No. 2001-076843, filed Mar. 16, 2001, the entire contents of all of which are incorporated herein by reference.

BACKGROUND OF THE INVENTION

1. Field of the Invention

The present invention relates to a line linkage protective device for electricity generation equipment to be linked to an alternating current power line through a breaker, being equipped with an inverter for converting direct current power into alternating current power. More particularly, the invention relates to a line linkage protective device for an electricity generation equipment in which the sole operation of the electricity generation equipment in line linkage can be assuredly and readily detected, on the electricity generation equipment side, and protected at a low cost, without having to provide an expensive transfer breakage apparatus.

2. Description of the Related Art

In general, a line linkage protective device for electricity generation equipment is used for a high voltage consumer to make line linkage between the private power generation apparatus and the alternating current power line. Now, private power generation apparatuses include, for example, garbage-powered turbines or co-generation system. In recent years, there is used a small sized gas turbine electricity generation apparatus which is designed to provide an output of several tens of kilowatts by revolving a generator at high speed with a gas turbine.

In the line linkage protective device of this kind, a transfer breakage apparatus is provided, to protect a private power generation apparatus, based on the signal from a substation. However, as the transfer breakage apparatus of this kind necessitates use of the apparatus at both the substation and the private power generation apparatus ends of the transfer means, and use of an exclusive transfer channel (communication line), it inevitably becomes very expensive.

Also, as described above, in the line linkage protective device of the power generation equipment of this kind, if the output power of the synchronous generator and the required power of the load are approximately equal to the effective portion and the ineffective portion, then neither the frequency nor the voltage shows changes even slightly. Accordingly, in such a case, continuous operational state is maintained, upon non-operation of any of the protective relays. This is the so-called phenomenon of "sole operation" (islanding), which prevents re-closing of the breaker channel.

Conventionally, therefore, in order to prevent such islanding, there is adopted a method of applying transfer breakage to the breaker by providing an exclusive line from the substation. Such a transfer breakage apparatus opens the breaker by sending a break signal to the breaker on detecting a signal in which the breaker of a superior substation is opened.

However, as the transfer breakage apparatus of this kind is extremely costly to private power generation companies of medium and small capacities of several hundred kW, and further, as it is necessary to install transfer means and a transmission channel, it is not possible to obtain the merit of energy cost reduction by the laying of the private power generation apparatus.

BRIEF SUMMARY OF THE INVENTION

An object of the present invention is to provide a line linkage protective device for an electricity generation equipment in which the sole operation of the electricity generation equipment in line linkage can be assuredly and readily detected on the electricity generation equipment side and protected, without providing an expensive transfer breakage apparatus.

The above object can be attained by the following inventions:

According to the first aspect of the present invention, there is provided a line linkage protective device of an electricity generation equipment equipped with an electric generator driven by a motor, and linked to an alternating current power line with an inverse current through a breaker, comprising a governor for controlling the frequency of the generator under an instruction signal from an external source, function generating means having a function characteristic of the frequency instruction for detecting the frequency variation rate of the generator and outputting a large output signal to the value of the frequency variation rate, effective power adjusting means for detecting the effective power of the generator and outputting the output signal proportionate to the detected signal, protective relay means for sensing abnormality of the frequency variation rate of the generator and outputting the breaking signal of the breaker, and an adder for synthesizing the output signal from the function generating means with the output signal from the effective power adjusting means and inputting the synthesized result to the governor as an instruction signal; wherein, at the time of a power outage on the alternating current power line side, the power outage on the alternating current power line side is detected by shifting the frequency variation rate of the generator to a level sensed by the protective relays by the function characteristic of the function generator.

By this step, there is used a signal made by synthesizing an output signal from the function generating means having a function characteristic of the frequency instruction for outputting a large output signal to the value of the variation rate of the frequency of the generator, with an output signal from the effective power adjusting means for outputting an output signal proportionate to the effective power of the generator, as an instruction signal of the governor for controlling the frequency of the generator. And, by shifting the frequency variation rate of the generator to a level which can be sensed by the protective relay means based on the function characteristic of the function generating means on a power supply outage on the alternating current power line, the power supply outage is detected. Furthermore, by shifting the slight frequency variations rate to the level sensed by the protective relay means, the islanding of the private power generation equipment in the line linkage is steadily and readily detected and protected on the private power generation equipment side at a low cost, without having to provide the expensive transfer breakage apparatus of the conventional case.

According to the second aspect of the present invention, there is provided a line linkage protective device for electricity generation equipment equipped with an inverter for converting direct current power into alternating current power, linked to an alternating current power line through a breaker, comprising frequency detecting means for detecting the output frequency of the inverter, frequency variation rate detecting means for detecting the variation rate of the frequency detected by the frequency detecting means, power factor reference judging means for defining by function the relationship between the frequency variation rate and the power factor so that the power factor reference for promoting the variation of the frequency is outputted respectively to the inverter by varying the power factor of the inverter to the direction of advance when the frequency variation rate is positive and by varying the power factor of the inverter to the direction of delay when the frequency variation rate is negative, based on the frequency variation rate detected by the frequency variation rate detecting means, and protective means for detecting the frequency variation promoted according to the variation of the power factor of the inverter formed by giving the power factor reference outputted from the power factor reference judging means to the inverter, and opening the breaker to release the private power generation equipment from the alternating current power line.

By this step, the variation rate of the output frequency of the inverter is detected. And, when the frequency variation rate is positive, the power factor of the inverter is caused to vary in the direction of advance, and when the frequency variation rate is negative, the power factor reference for promoting the variation of the frequency is given to the inverter respectively by varying the power of the inverter in the direction of delay. In this manner, by varying the power factor of the inverter, the frequency variation can be enlarged. Accordingly, the islanding of the private power generation equipment in the line linkage is steadily and readily detected and protected on the private power generation equipment side at a low cost, without providing an expensive transfer breakage apparatus as required in the conventional case.

According to the third aspect of the present invention, the device comprises the frequency detection means equipped with a synchronous generator driven by a motor, for detecting the frequency from the output of the synchronous generator of the private power generation equipment linked to the alternating current power line through the breaker, voltage variation detecting means having the output voltage of the alternating current power line as an input, for eliminating errors in the frequency generated by the voltage variation by locking the output from the frequency detection means when the input voltage varies, frequency variation rate detection means for detecting the variation rate of the frequency outputted from the voltage variation detecting means, voltage swinging signal generating means for operating the voltage swinging signal in a manner to promote the variation of frequency, based on the frequency variation rate detected by the frequency variation rate detection means, and giving the voltage swinging signal to the automatic voltage adjuster of the synchronous generator, and protecting means for detecting the frequency variation promoted by the voltage variation of the synchronous generator formed by giving the voltage swinging signal operated by the swinging signal generating means to the automatic voltage adjuster and opening the breaker to release the synchronous generator from the alternating current power line.

By this step, the variation rate of the frequency of the synchronous generator of the private power generation equipment is detected. And, when the frequency variation rate is positive, the voltage of the synchronous generator is caused to vary in the lowering direction, and when the frequency variation rate is negative, the voltage of the synchronous generator is caused to vary in the raising direction, to enlarge the frequency variation. Consequently, the islanding of the private power generation equipment in the line linkage is steadily and readily detected and protected on the private power generation equipment side, without providing an expensive transfer breakage apparatus as required in the conventional case.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Preferred embodiments of the present invention will be explained below with reference to the accompanying drawings.

Figure 1:
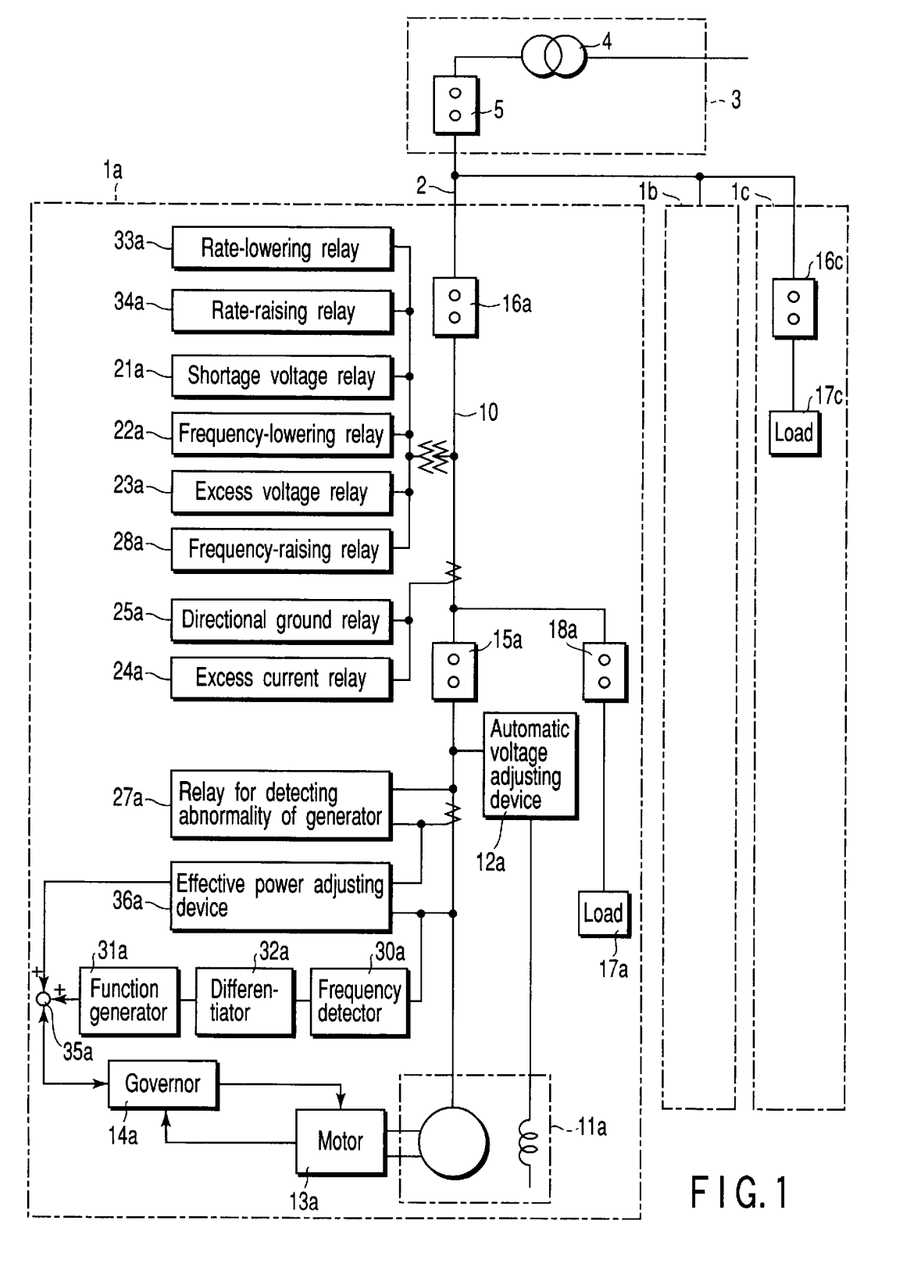
FIG. 1 is a block diagram showing an example of the line linkage protective device of the private power generation equipment according to the first embodiment.
Figure 2:
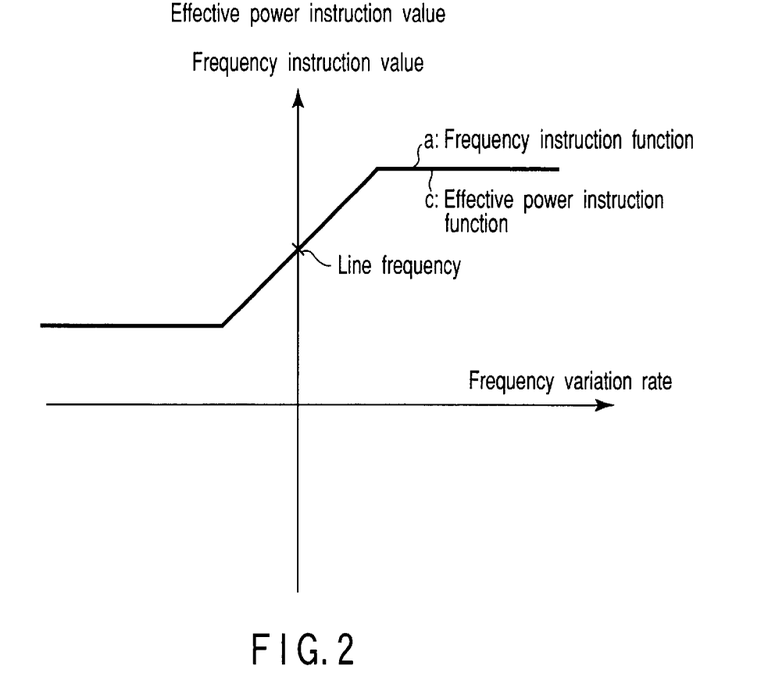
FIG. 2 is a view showing an example of the function characteristics held by the function generator in the line linkage protective device of the private power generation equipment according to the first embodiment.
Figure 3:
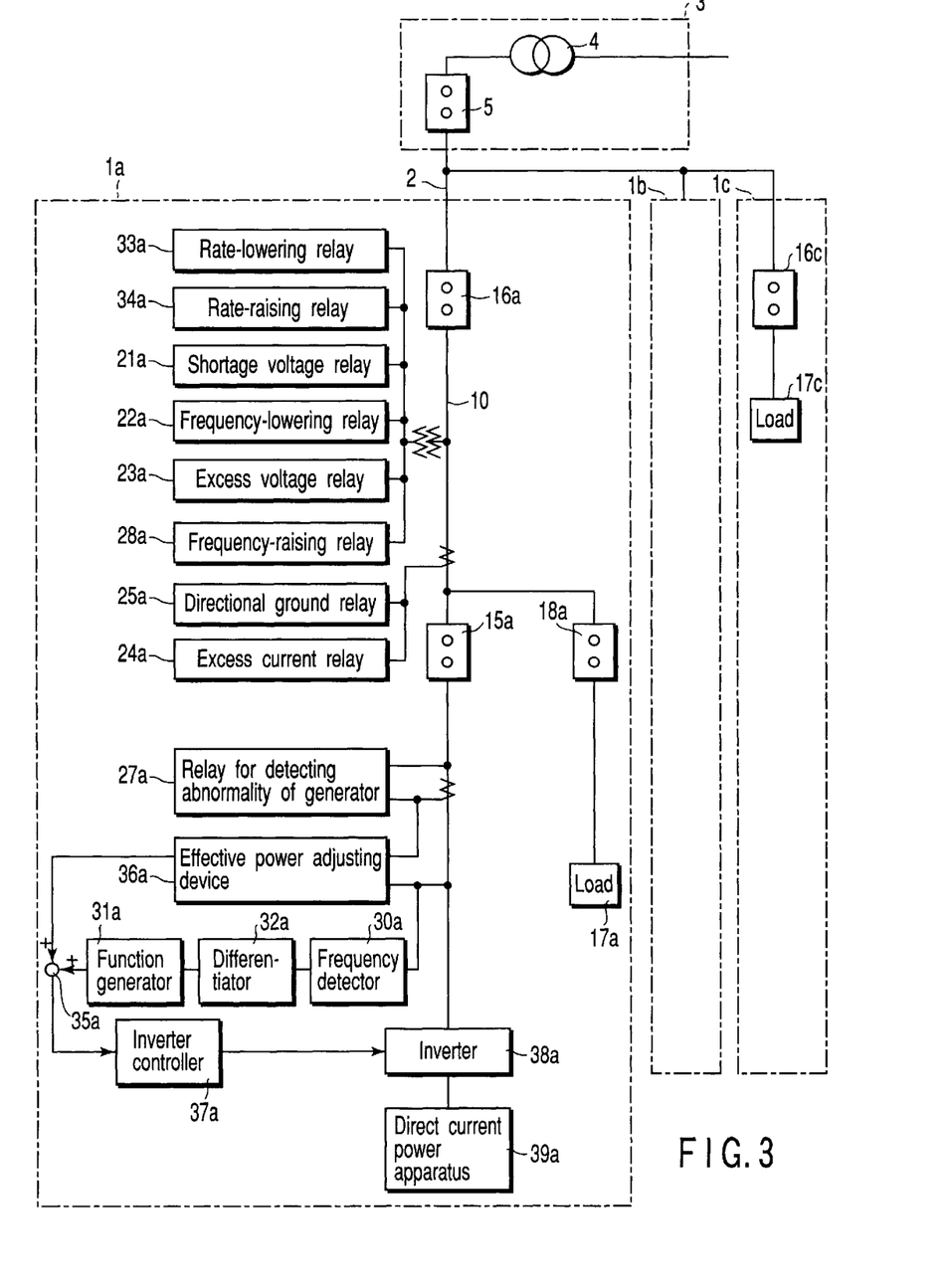
FIG. 3 is a block diagram showing an example of the line linkage protective device of the private power generation equipment according to the second embodiment.
Figure 4:
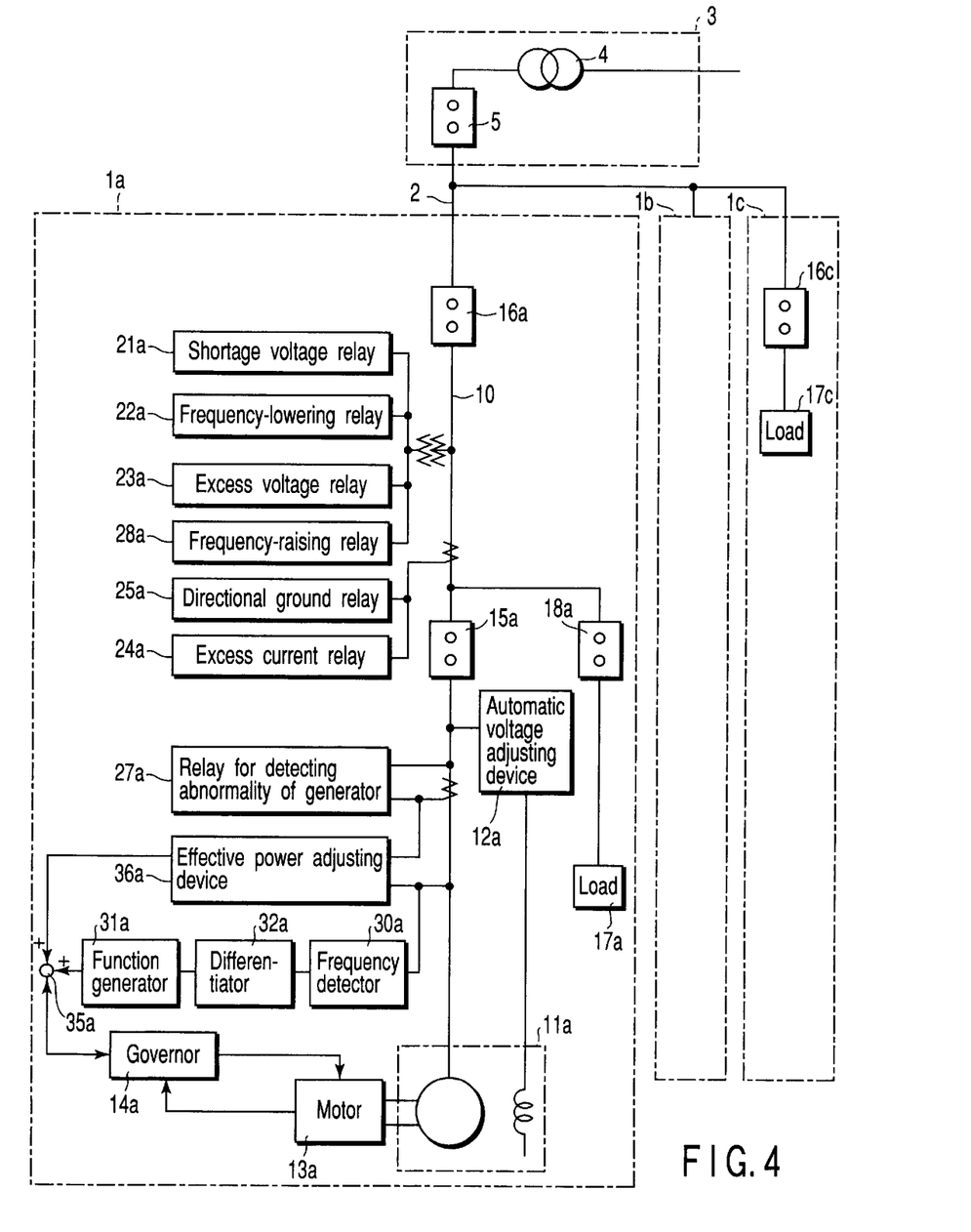
FIG. 4 is a block diagram showing an example of the line linkage protective device of the private power generation equipment according to the third embodiment.
Figure 5:
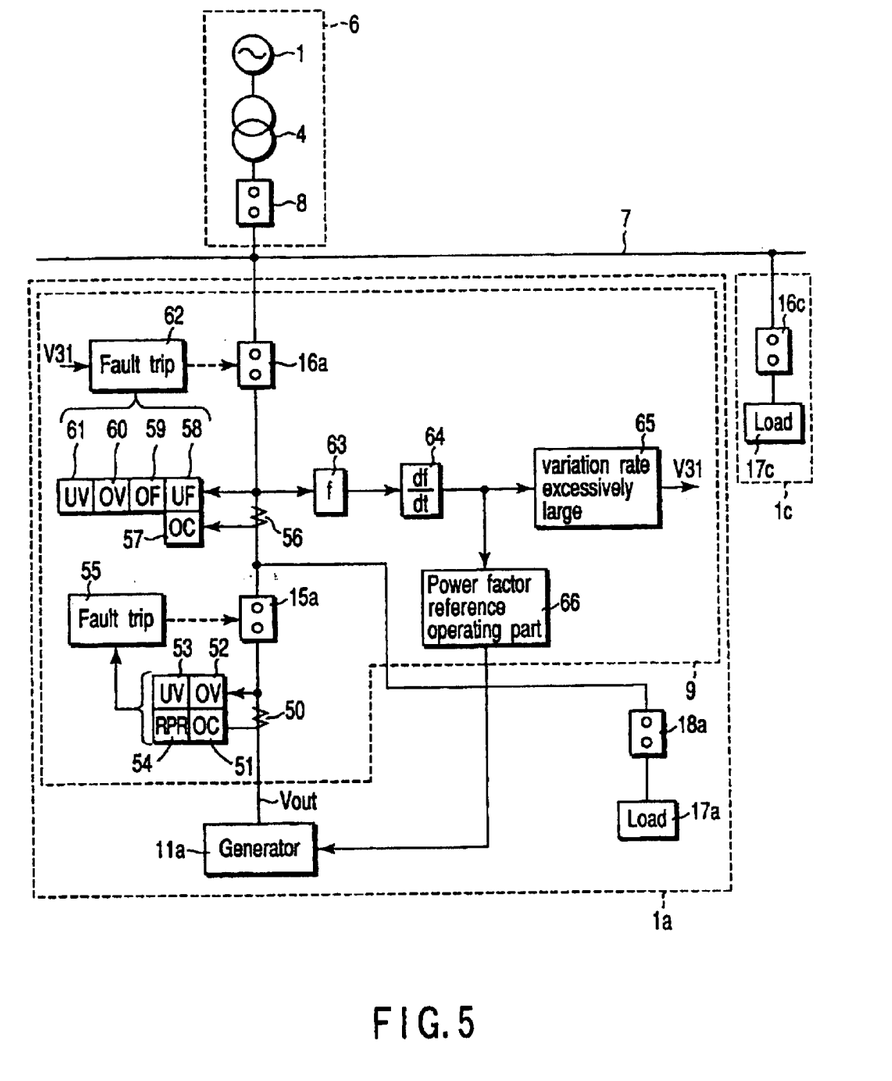
FIG. 5 is a block diagram showing an example of the line linkage protective device of the private power generation equipment according to the fifth embodiment.

FIG. 5 is a block diagram showing a construction example of the line linkage protective device of the power generation equipment according to the fifth embodiment of the present invention.

That is to say, the line linkage protective device of the power generation equipment according to this embodiment is constituted by a superior substation 6, a distribution line 7 for distributing the power from the superior substation 6 side to consumers, a general consumer 1c, and a private power generator installing consumer 1a equipped with a private power generating apparatus.

In the superior substation 6, the voltage of the line power source 1 is reduced through a transformer 4, and power is supplied to the general consumer 1c through the breaker 8. In the general consumer 1c, power is supplied to a load 17c through the breaker 16c.

Figure 6:
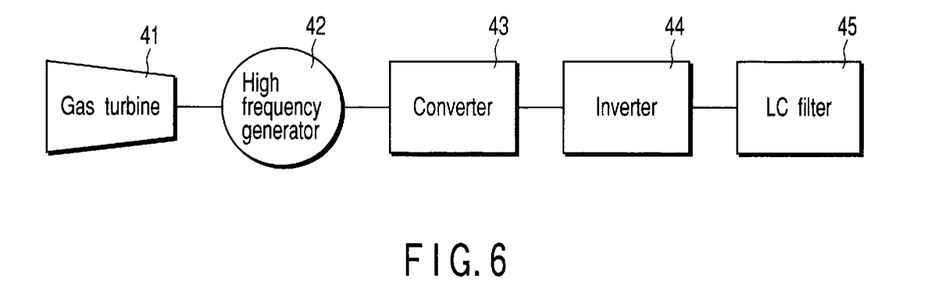
FIG. 6 is a block diagram showing an example of the constitution of a small sized gas turbine generator device.

On the other hand, the private generator installing consumer 1a is equipped with a generator 11a comprising a small sized gas turbine power generating apparatus as shown for example in FIG. 6 and being linked to a distribution line 7, a load 17a for receiving power through the breaker 18a, and a line linkage protective apparatus 9.

The small sized gas turbine power generating apparatus generates power under direct connection of the high frequency generator 42 with the gas turbine 41, converts the alternating current outputted by the high frequency generator 42 once into the direct current power by a converter 43, after which it converts said current into an alternating current power of desired commercial frequency by the inverter 44, followed by eliminating the harmonics by an LC filter 45 to output power.

Figure 7:
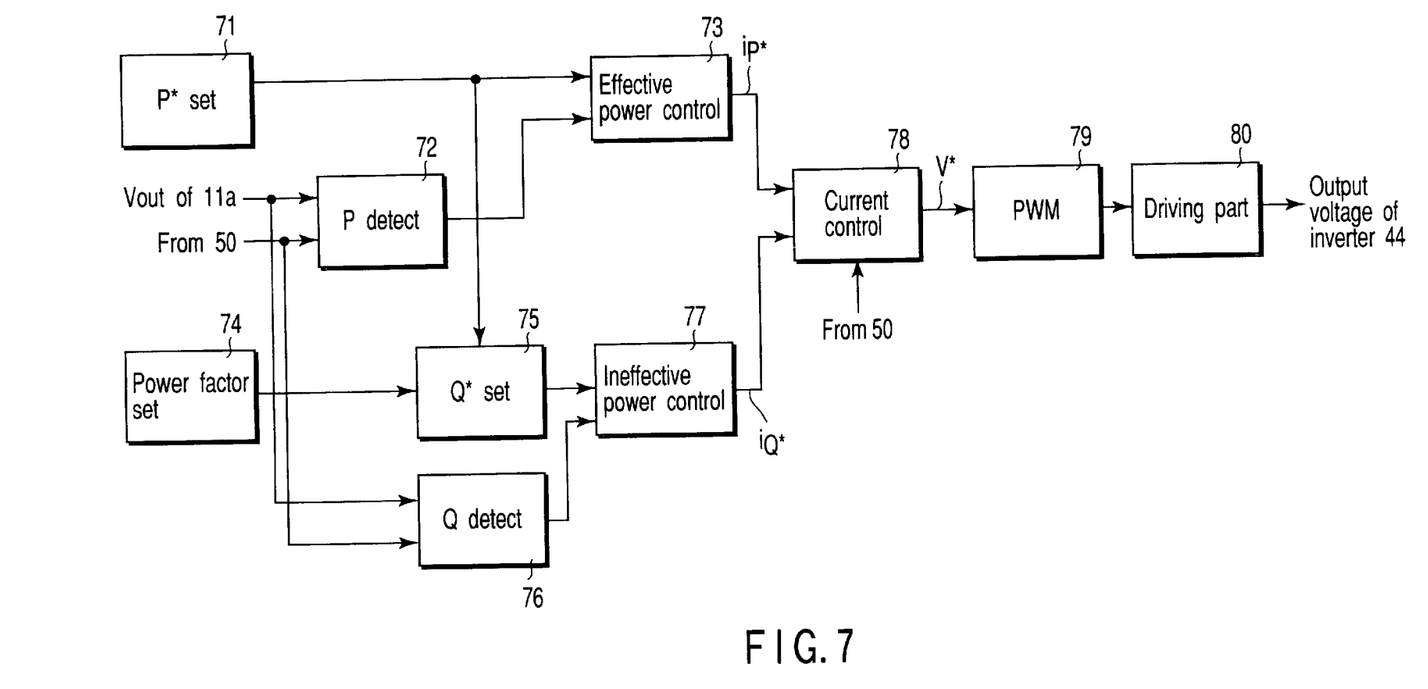
FIG. 7 is a block diagram showing an example of the constitution of a control circuit of an inverter.

FIG. 7 is a block diagram showing a constitution example of the inverter 44.

In FIG. 7, the inverter 44 is a voltage type inverter, which controls the current.

An effective power detection circuit 72 operates the effective power based on the output voltage Vout of the generator 11a and the output of the converter 50.

An effective power control circuit 73 outputs an effective current standard ip* based on the above effective power and the set value of the effective power standard setter 71.

The ineffective power standard setter 75 operates the ineffective power standard based on the set value of the power factor setter 74 and the effective power standard.

The ineffective power standard setter 76 operates the ineffective power standard based on the output voltage Vout of the generator 11a and the output of the converter 50.

The ineffective power control circuit 77 inputs the above ineffective power and ineffective power standard and outputs the ineffective current standard IQ*.

The current standards ip*, iQ* and the current detected by the converter 50 are inputted in the current control circuit 78 and output the inverter output voltage instruction value V*.

The output voltage of the inverter 44 is controlled through the PWM control circuit 79 and the driving part 80.

The line linkage protective device 9 is provided with an over-current relay (OC) 51 for detecting the over-current of the generator 11a from the converter 50, an over-voltage relay (OV) 52 for detecting the abnormality of the output voltage of the generator 11a, an under-voltage relay (UV) 53, and a reverse power relay (RPR) 54 for detecting the reverse power of the generator 11a. And, based on the detection signals of these protective relays 51–54, a failure trip circuit 55 is operated so that the failure trip circuit 55 gives trip instruction to the breaker 15a to open the breaker 15a.

In addition, there are provided an over-current detector (OC) 57 for detecting an over-current based on the output current of the converter 56, an under-frequency relay (UF) 58 for detecting that the frequency or voltage becomes abnormal from the unbalanced condition between the output power of the generator 11a and the load power of the load 17a at the time of the abnormality of the line power source 1, especially when the line power source 1 is broken by the release of for example the breaker 8, over-frequency relay (OF) 59, over-voltage relay (OV) 60, and under-voltage relay (UV) 61. And, based on the detection signals of these protective relays 57–61, a failure trip circuit 62 is operated to give trip instruction to the breaker 16a and release the breaker 16a, to provide a condition to make it possible to close the channel of the breaker 8 again.

The frequency detector 63 detects the output frequency of the inverter 44 of the generator 11a.

The frequency variation rate detector 64 detects the variation rate of the frequency detected by the frequency detector 63.

The excessively large frequency variation rate detector 65, when detecting that the frequency variation rate is excessively large based on the frequency variation rate detected by the frequency variation rate detector 64, outputs an abnormal output signal to the failure trip circuit 62.

The power factor operator 66 causes to change the power factor of the inverter 44 of the generator 11a in the direction of advance when the frequency variation rate is positive based on the frequency variation rate detected by the frequency variation rate detector 64, and causes to change the power factor of the inverter 44 of the generator 11a in the direction of delay when the frequency variation rate is negative. By this, the relationship between the frequency variation rate and the power factor is defined by the function so that the power factor reference for promoting the variation of the frequency is each outputted to the inverter 44 of the generator 11a.

Next, explanation is given on the operation of the line linkage protective device of the generating equipment according to this embodiment constituted as above.

In the line linkage protective device of the generating equipment according to this embodiment, with the frequency detector 63, an output frequency of the inverter 44 of the generator 11a is detected.

With the frequency variation rate detector 64, the variation rate of the frequency detected by the frequency detector 63 is detected.

With the excessively large frequency variation rate detector 65, judgment is made as to whether the frequency variation rate detected by the frequency variation rate detector 64 is more than the previously determined set value or not, and when it is detected that the frequency variation rate has become excessively large, namely, more than the set value, an abnormality output signal V31 is outputted to the failure trip circuit 62.

By this, the breaker 16a is released, so the private power generating equipment is separated from the alternating current power line and is protected.

In the power factor reference operator 66, based on the frequency variation rate detected by the frequency variation rate detector 64, the operator causes to change the power factor of the inverter 44 of the generator 11a in the direction of advance when the frequency variation rate is positive. To the contrary, when the frequency variation rate is negative, it causes to change the power factor of the inverter 44 of the generator 11a in the direction of delay. By this, the power factor reference for promoting the variation of the frequency is each outputted to the inverter 44 of the generator 11a.

That is to say, in the power factor reference operator 66, the ineffective power to be outputted by the inverter 44 according to the frequency variation rate is determined.

This relationship is represented as in the following expression:

$$\Delta Q1 = -K \cdot df/dt \qquad (K: \text{constant})$$

wherein $\Delta Q1$ is a ratio of the output ineffective power to the output effective power of the inverter 44, in which the ineffective power of delay is taken as positive.

Figure 8:
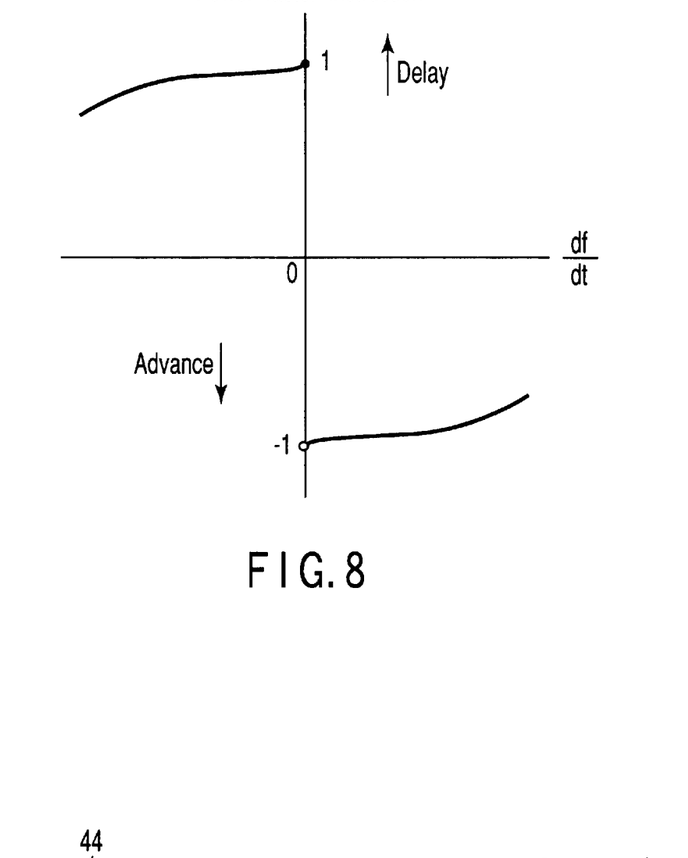
FIG. 8 is a view showing an example of the configuration of the function for judging the power factor in the line linkage protective device of the power generation equipment according to the fifth embodiment.

Since the relationship between Q1 and the power factor is $$\text{Power factor} = \begin{cases} \dfrac{1}{\sqrt{1+(\Delta Q_1)^2}} & (\text{when } \Delta Q_1 \geq 0) - \\ -\dfrac{1}{\sqrt{1+(\Delta Q_1)^2}} & (\text{when } \Delta Q_1 < 0) \end{cases}$$

the relationship between the frequency variation rate and the power factor becomes as shown in FIG. 8.

Figure 9:
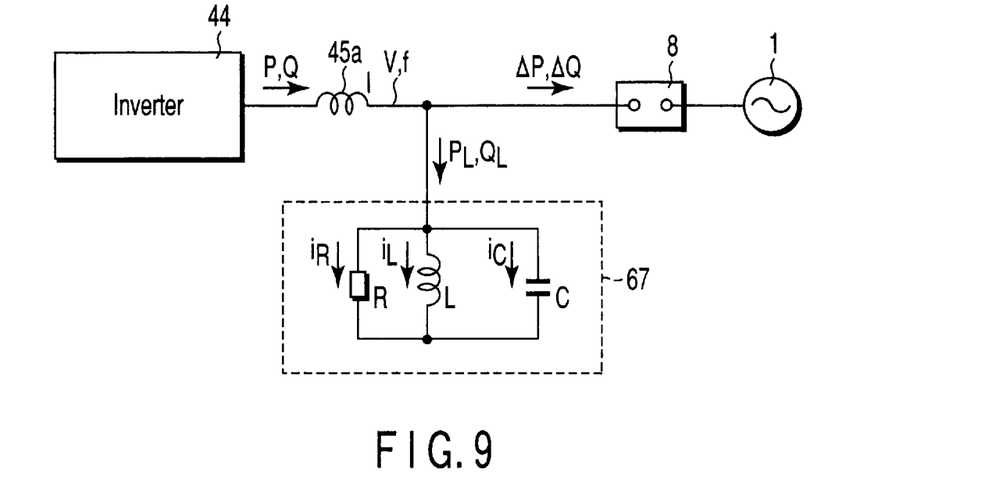
FIG. 9 is a view for illustrating the operation in the line linkage protective device of the power generation equipment according to the fifth embodiment.

Next, with respect to the above point, more detailed explanation is given with reference to FIG. 9.

FIG. 9 is a view for illustrating the power flowing from the inverter 44.

In FIG. 9, the part 45a shows a reactor of the LC filter 45 in FIG. 6.

The load 67 is considered to be a unitary load in combination of the load 17a with the load 17c in FIG. 5.

In FIG. 9, assuming the effective power outputted by the inverter 44 to be P, the ineffective power to be Q, the effective power necessitated by the load 67 to be PL, and the ineffective power to be QL, the effective power $\Delta P$ and the ineffective power $\Delta Q$ flowing out to the line power source 1 are represented respectively as follows:

$$\Delta P = P - PL$$

$$\Delta Q = Q - QL$$

wherein the inverter 44 and the inter-line inductance part are assumed to be 1, the voltage of the load 67 to be V, and the frequency to be f.

Then, in an ordinary case, even if the breaker 8 is opened under the condition near $\Delta P \approx 0$, $\Delta Q \approx 0$, the voltage V and the frequency f of the load 67 show scarce change, and no detection can be made with the protective relays 57–61, and islanding is to be continued. However, because the phases of the line power source 1 and the load 67 come to be displaced gradually due to minute frequency differences, the re-input of the breaker 8 leads to expansion of accident to provide a dangerous condition, and to lower the stability of the distribution line.

As the output effective power P is all consumed by the resistor R during islanding, the voltage is determined by:

$$P = V2/R$$

The frequency f during islanding is determined by:

$$Q = 2\pi f C V^2 - C V^2/2\pi f L.$$

In case the ineffective power supplied by the inverter 44 is displaced to the advance direction by more than the ineffective power QL required by the load 67, the frequency f rises to increase the current iC of the capacitor C, and the inductance current iL decreases to vary the ineffective power to the balancing direction.

Furthermore, when the ineffective power supplied by the inverter 44 is displaced to the direction of delay by more than the ineffective power QL required by the load 67, the frequency f falls to increase the inductance current iL, and the current iC of the capacitor C decreases to vary the ineffective power to the balancing direction.

Now, assuming that islanding is made under the condition of $\Delta Q \approx 0$ and $\Delta Q > 0$, the frequency f is slightly lowered to become df/dt<0.

When the condition becomes df/dt<0, due to the characteristics as shown in FIG. 8, the power factor reference of the inverter 44 is varied to the direction of delay, and the ineffective power supplied by the inverter 44 is displaced to the direction of delay to act so that the frequency f shows further lowering.

On the other hand, assuming that islanding is made under the condition of $\Delta Q < 0$, inverse to the above case, the action is to be made to cause the frequency to rise.

In this manner, variation of frequency is increased by the positive feedback action and the excessively large frequency variation rate is detected by the excessively large frequency variation rate detector 65 to output an abnormality signal V31.

And, in the failure trip circuit 62, by this abnormality signal V31, the breaker 16a is opened to cause parallel off to the generator 11a.

By this step, even without using the transfer breaking apparatus in conventional use, islanding of the private power generation equipment can be detected.

As described above, in the line linkage protective device of power generation equipment according to this embodiment, the variation rate df/dt of the output frequency f of the inverter 44 of the generator 11 is detected, and in case of df/dt>0, the power factor of the inverter 44 is varied in the direction of advance. On the other hand, in case of df/dt<0, the power factor of the inverter 44 is varied in the direction of delay. Consequently, it becomes possible to expand the frequency variation, and even without providing an expensive transfer breaker, it becomes possible to detect assuredly and readily and protect the islanding of the private power generation equipment in line linkage on the side of the private power generation equipment.

Sixth Embodiment

Figure 10:
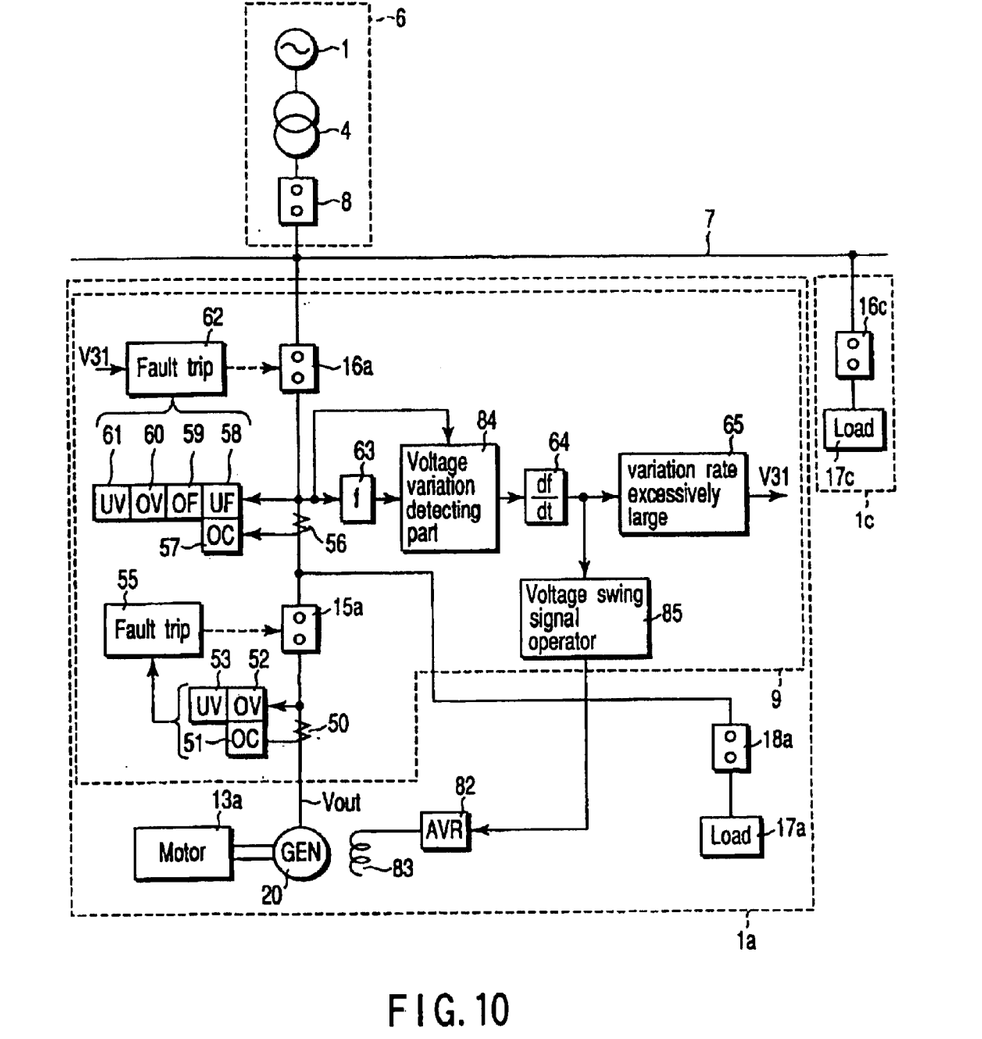
FIG. 10 is a block diagram showing an example of the line linkage protective device of the private power generation equipment according to the sixth embodiment.

FIG. 10 is a block diagram showing a constitution example of constitution of the line linkage protective device of the generating equipment according to the sixth embodiment.

In FIG. 10, in the superior substation 6 which is an alternating current line, the voltage of the line power source 1 is reduced through a transformer 4, and power is supplied to the general consumer 1c through the breaker 8 by the distribution line 7 for distributing the power from the superior substation 6 side to the general consumer 1c. The general consumer 1c consumes power by a load 17c through the breaker 16c.

On the other hand, in the private power generation equipment and the private power generation equipment installing consumer 1*a* having the line linkage protective device 9 in installation, the output of the synchronous generator 20 driven by the motor 13*a* is linked to the superior substation 6 through the breaker 15*a*, breaker 16*a*.

Control of the output voltage of the synchronous generator 20 is carried out by controlling the voltage of the field winding 83 of the synchronous generator 20 by the automatic voltage regulator (AVR) 82. Control of the output frequency of the synchronous generator 20 is carried out by controlling the motor power by the non-illustrated governor of the motor 13*a* that drives the synchronous generator 20.

The private power generation equipment installing consumer 1*a* is to receive the power from the superior substation 6 side through the breaker 16*a*, breaker 18*a* and consume it by the load (on-site load) 17*a*.

On the other hand, the line linkage protective device 9 has a converter 50 for detecting the output current provided on the output side of the synchronous generator 20. Also, there are provided an over current relay (OC) 51 for detecting the over current of the synchronous generator 20 based on the output current of the converter 50, and an over voltage relay (OV) 52 and an under voltage relay (UV) 53, each for detecting the abnormality of the output voltage of the synchronous generator 20. And, based on the detection signals of these protective relays 51–53, the fault trip circuit 55 is operated to output the trip signal to release the breaker 15*a*.

Furthermore, besides the above, there are provided as the protective means a converter 56 on the output side of the breaker 15*a*, further an over-current detector (OC) 57, an under-frequency relay (UF) 58, an over-frequency relay (OF) 59, an over-voltage relay (OV) 60, and an under-voltage relay (UV) 61.

The over-current detector (OC) 57 detects the over-current based on the output current of the converter 56.

The under-frequency relay (UF) 58 detects that the frequency or voltage becomes abnormal due to the unbalanced condition between the output power of the synchronous generator 20 and the load power of the load 17*a* at the time of the abnormality of the line power source 1, especially when the line power source 1 is broken by the release of for example the breaker 8.

And, based on the detection signals of these protective relays 57–61, a failure trip circuit 62 is operated to output trip signal and release the breaker 16*a*, thereby providing a condition to make it possible to close the channel of the breaker 8 again.

The frequency detector 63 detects the frequency from the output of the synchronous generator 20.

Figure 11:
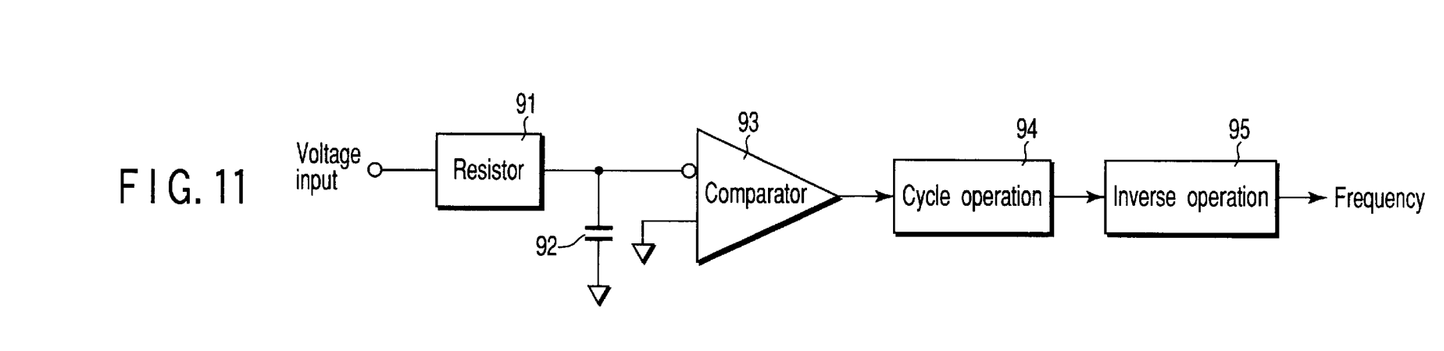
FIG. 11 is a circuit diagram showing an example of the constitution of a frequency detector in the line linkage protective device of the power generation equipment according to the sixth embodiment.

That is to say, this frequency detector 63 comprises, as shown in FIG. 11, a filter circuit having the output voltage of the synchronous generator 20 as an input and comprising a resistor 91 for smoothly shaping the waveform of the voltage and a capacitor 92, a periodic operator 94, and an inverse computing portion 95.

The comparator 93 converts the waveform shaped by the filter circuit into a rectangular wave of zero cross.

The cycle computing portion 94 operates the cycle of the voltage input signal from the rising signal of the rectangular wave converted by the comparator 93.

The inverse computing portion 95 operates the frequency from the cycle operated by the cycle computing portion 94.

The voltage variation detecting part 84 employs the output voltage of the superior substation 6 which is an alternating current power line as input, and, in case the related input voltage has varied, it locks the output from the frequency detector 63 to eliminate the error of the frequency generated by the voltage variation above.

The frequency variation rate detector 64 detects the variation rate of the frequency outputted from the voltage variation detecting part 84.

The voltage swing signal operator 85 operates the voltage swing signal so as to promote the variation of the frequency based on the frequency variation rate detected by the frequency variation rate detector 64, and gives the voltage swing signal to the automatic voltage regulator 82 of the synchronous generator 20.

In other words, this voltage swing signal operator 85 determines the voltage swing standard to be given to the automatic voltage regulator 82 according to the frequency variation rate based on the following relative expression:

$$\Delta V^* = -K(df/dt) \qquad (K: \text{constant})$$

The excessively large frequency variation rate detector 65 detects the frequency variation promoted by the voltage variation of the synchronous generator 20 formed by giving the voltage swing signal operated by the voltage swing signal operator 85 to the automatic voltage regulator 82 of the synchronous generator 20, and opens the breaker 16*a* to cause parallel off of the synchronous motor 20 from the superior substation 6 which is an alternating power line.

In other words, this excessively large frequency variation rate detector 65 judges whether the frequency variation rate is more than the predetermined set value or not, and when the rate has become to the level higher than the set value, outputs the abnormality output signal V31 to the failure trip circuit 62.

Figure 12A:
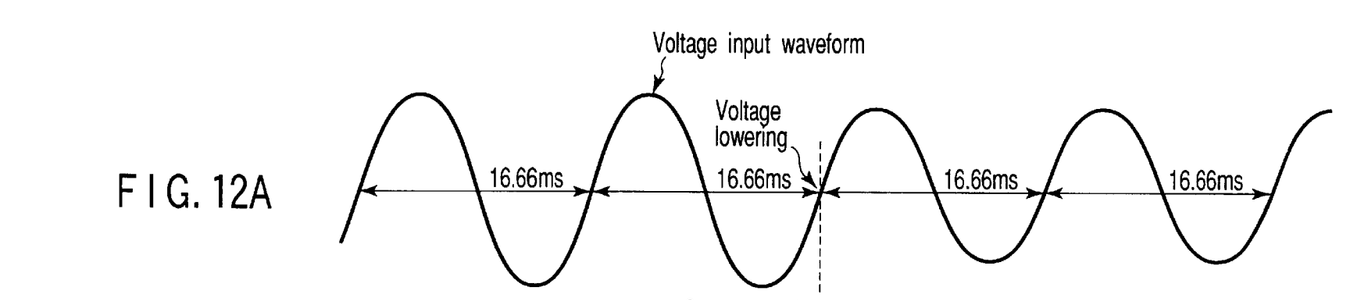
FIG. 12A is a voltage input waveform diagram in the line linkage protective device of the power generation equipment according to the sixth embodiment.
Figure 12B:
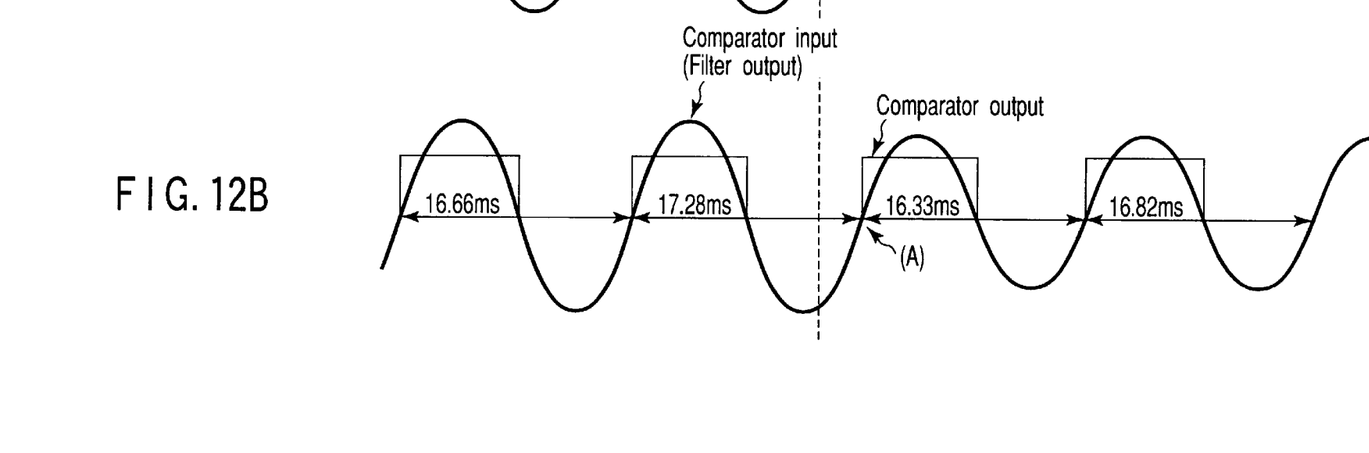
FIG. 12B is a comparator output waveform diagram in the line linkage protective device of the power generation equipment according to the sixth embodiment.

Next, with respect to the action of the line linkage protective device of the power generation equipment according to this embodiment which is constituted as above, explanation is given with reference to the waveform diagram shown in FIG. 12.

In the line linkage protective device of the power generation equipment according to this embodiment, in the frequency detector 63, a frequency is detected from the output of the synchronous generator 20.

That is to say, in the frequency detector 63, as shown in FIG. 11, for the purpose of the countermeasures against the waveform distortion of voltage input, firstly, the waveform is smoothly shaped by the filter circuit comprising a resistor 91 and a capacitor 92, and its waveform is given to the comparator 93 and converted to the zero cross rectangular wave.

In the cycle computing portion 94, a cycle of the voltage input signal is obtained from the rising signal of the rectangular wave, and the frequency is operated by the inverse computing portion 95.

In the frequency detector 63 having such circuit constitution, in case the input voltage has abruptly dropped, a direct current part is exerted to the input voltage. Accordingly, an imbalance occurs between the positive and the negative waveform after the filter circuit. As a result, as in the comparator output point (A) shown in FIG. 12B, the timing of rise of the rectangular wave is displaced to the voltage input waveform shown in FIG. 12A, an error is formed to the cycle operation and frequency error is formed.

In the voltage variation detecting part 84, in case of the abrupt variation of the voltage of the superior substation 6 which is an alternating current power line, arrangement is made not to use the cycle value at that time for the operation of the frequency, thereby obviating generation of the error of the frequency detection. Assuming the effective power of output from the synchronous generator 20 to be P, the ineffective power to be Q, the effective power necessitated by the total load of the load 17a and the load 17c to be $P_L$, and the ineffective power to be $Q_L$, the effective power ΔP and the ineffective power ΔQ running out to the line power source 1 are represented respectively as follows:

ΔP=P-PL

ΔQ=Q-QL wherein the voltage of the total load is V, and the frequency is f.

In an ordinary case, even if the breaker 8 is opened under the condition near ΔP≈0, ΔQ≈0, the voltage V of the total load and the frequency f show scarce variation. Therefore, it is not possible to detect the protective relays 57–59, and islanding is to be continued.

However, since the phases of the line power source 1 and the total load are gradually displaced in view of the trifling frequency difference, re-charging of the breaker 8 leads to enlargement of accident to provide a dangerous condition, by which stability of the distribution line is to be lowered.

Next, the principle of detecting the islanding of the synchronous generator 20 is explained below.

The effective power of the load is represented by:

$$P=(V^2 \cos \phi)/R \qquad (1)$$

(V: a voltage, R: resistance value, cos φ: power factor)

Here, there is considered a case where the frequency is slightly lowered during the islanding of the synchronous generator 20. In such a case, in the voltage swing signal operator 85, the voltage swing signal is outputted so that the voltage of the synchronous generator 20 is slightly raised.

Then, as the load power represented by the above expression (1) increases, the torque of the load increases, and the rotation speed of the synchronous generator 20, namely the frequency, shows lowering.

Due to this positive feedback, frequency variation is increased, and the excessively large frequency variation rate is detected by the excessively large frequency variation rate detector 65 to output an abnormality signal $V_{31}$.

In case at first the frequency is slightly increased, by the inverse action to the above, variation is increased in the direction to cause rise in frequency, where the excessively large frequency variation rate is detected by the excessively large frequency variation rate detector 65 and an abnormality signal $V_{31}$ is outputted.

In the failure trip circuit 62, by this abnormality signal $V_{31}$, the breaker 16a is shut to cause parallel off of the synchronous generator 20.

By this step, even without using the transfer breaking apparatus in conventional use, it becomes possible to detect islanding on the side of the private power generation equipment.

As described above, in the line linkage protective device of power generation equipment according to this embodiment, the variation rate df/dt of the frequency of the synchronous generator 20 of the private power generation equipment is detected, and in case the frequency variation rate is positive (df/dt>0), the voltage of the synchronous generator 20 is caused to vary in the direction of lowering, while on the other hand, in case the frequency variation rate is negative (df/dt<0), the voltage of the synchronous generator 20 is varied in the direction of rise. Consequently, it becomes possible to expand the frequency variation, and even without providing an expensive transfer breaking apparatus as required conventionally, it becomes possible to detect assuredly and readily the islanding of the private power generation equipment in line linkage on the side of the private power generation equipment to make parallel off of and protect the synchronous generator 20.

Moreover, in detecting the frequency of the synchronous generator 20 of the private power generation equipment, arrangements are made so that the waveform of the output voltage of the synchronous generator 20 is smoothly shaped, the shaped waveform is converted into a zero cross rectangular wave, a cycle of the voltage input signal is operated from the rising signal of the rectangular wave, and the frequency is operated from said cycle. Accordingly, even if the input voltage shows abrupt variation, it becomes possible to detect the output frequency of the synchronous generator 20 of the private power generation equipment accurately and securely.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A line linkage protective device of an electricity generation equipment equipped with an inverter for converting the direct current power into the alternating current power, and linked to an alternating current power line through a breaker, comprising:

a frequency detector for detecting an output frequency of the inverter;

a frequency variation rate detector for detecting the variation rate of the frequency detected by the frequency detector;

a power factor reference definition part for defining the relationship between the frequency variation rate and the power factor by a function so that, based on the frequency variation rate detected by the frequency variation rate detector, the power factor reference for promoting the variation of the frequency is outputted to the inverter, respectively, such that in case the frequency variation rate is positive, the power factor of the inverter is caused to vary in the direction of advance, and in case the frequency variation rate is negative, the power factor of the inverter is caused to vary in the direction of delay; and a protective part for detecting the frequency variation promoted by the power factor variation of the inverter formed by giving the power factor reference outputted from the power factor reference definition part to the inverter, opening the breaker to cause parallel off of the generating equipment from the alternating current power line.

2. A line linkage protective device of an electricity generation equipment provided with a synchronous generator to be driven by the motor, and linked to the alternating current power line through a breaker, comprising:

a frequency detector for detecting the frequency from the output of the synchronous generator;

a voltage variation detecting part for eliminating errors of the frequency generated by the voltage variation by locking the output from the frequency detector when the output voltage of the alternating current power line is taken as input and said input voltage shows variation;

a frequency variation rate detector for detecting the variation rate of the frequency outputted from the voltage variation detecting part;

a voltage swing signal operator for operating the voltage swing signal so as to promote the variation of the frequency based on the frequency variation rate detected by the frequency variation rate detector;

an automatic voltage regulator for controlling the voltage of the synchronous generator based on the voltage swing signal operated by the voltage swing signal operator; and a protecting part for detecting the frequency variation promoted according to the voltage control of the synchronous generator made by the automatic voltage regulator, opening the breaker and causing parallel off of the synchronous generator from the alternating current power line.

3. The line linkage protective device of an electricity generation equipment according to claim 2, wherein the frequency detector comprises:

filter circuits having an output voltage of the synchronous generator as an input, for smoothly shaping the waveform of the voltage;

a comparator for converting the waveform shaped by the filter circuits into the rectangular wave of zero cross;

a cycle computing portion for operating the cycle of the voltage input signal from the rising signal of the rectangular wave converted by the comparator; and an inverse computing portion for operating the frequency from the cycle operated by the cycle computer portion.

4. The line linkage protective device of an electricity generation equipment according to claim 3, wherein the filter circuits comprise a resistor and a capacitor.

* * * * *